(12) United States Patent
Luo

(10) Patent No.: US 12,522,271 B2
(45) Date of Patent: Jan. 13, 2026

(54) ELECTRIC WAGON

(71) Applicant: IMAMI TOYS HEBEI CO., LTD., Handan (CN)

(72) Inventor: Shuyong Luo, Handan (CN)

(73) Assignee: IMAMI TOYS HEBEI CO., LTD., Handan (CN)

( * ) Notice: Subject to any disclaimer, the term of this patent is extended or adjusted under 35 U.S.C. 154(b) by 329 days.

(21) Appl. No.: 18/255,006

(22) PCT Filed: Sep. 6, 2021

(86) PCT No.: PCT/CN2021/116635
§ 371 (c)(1),
(2) Date: May 30, 2023

(87) PCT Pub. No.: WO2022/121393
PCT Pub. Date: Jun. 16, 2022

(65) Prior Publication Data
US 2024/0010259 A1  Jan. 11, 2024

(51) Int. Cl.
*B62B 5/00* (2006.01)
*B62B 3/00* (2006.01)
(Continued)

(52) U.S. Cl.
CPC ............. *B62B 5/004* (2013.01); *B62B 3/02* (2013.01); *B62B 3/106* (2013.01); *B62B 5/0053* (2013.01);
(Continued)

(58) Field of Classification Search
CPC .......... B62B 5/004; B62B 3/02; B62B 3/106; B62B 5/0053; B62B 5/0069; B62B 5/04;
(Continued)

(56) References Cited

U.S. PATENT DOCUMENTS 8,011,686 B2 * 9/2011 Chen ................ B62B 3/106
280/87.01
8,276,692 B1 * 10/2012 Nwaeke ............ B62B 5/06
180/19.1
(Continued)

FOREIGN PATENT DOCUMENTS

CN  206766056 U   12/2017
CN  207535966 U * 6/2018
(Continued)

OTHER PUBLICATIONS

Translated KR-101484092-B1 (Year: 2025).*
Translated KR-20160093868-A (Year: 2025).*

*Primary Examiner* — James A Shriver, II
*Assistant Examiner* — Ian Bryce Shelton
(74) *Attorney, Agent, or Firm* — Simpson & Simpson, PLLC

(57) ABSTRACT

An electric wagon comprising a frame fixed to a push rod, front wheels and rear wheels below the frame, a body detachably connected with the frame, and a control unit fixed onto the frame; wherein the control unit comprises a controller, a control terminal wirelessly connected with the input terminal of the controller, and a motor electrically connected with the output end of the controller; and the motor is arranged within the rear wheel and connected with the rear wheel. A control unit is provided on the basis of the existing wagon so as to implement intelligent control of moving forward, moving backward, accelerating, braking and other functions, and is easy to operate and multifunctional.

8 Claims, 4 Drawing Sheets

(51) Int. Cl.
    *B62B 3/02*           (2006.01)
    *B62B 3/10*           (2006.01)
    *B62B 5/04*           (2006.01)
    *B62B 5/06*           (2006.01)
    *F21V 23/02*         (2006.01)
    *F21Y 115/10*       (2016.01)

(52) U.S. Cl.
    CPC .............. *B62B 5/0069* (2013.01); *B62B 5/04* (2013.01); *B62B 5/067* (2013.01); *B62B 3/002* (2013.01); *B62B 2205/06* (2013.01); *F21V 23/02* (2013.01); *F21Y 2115/10* (2016.08)

(58) Field of Classification Search
    CPC ..... B62B 5/067; B62B 3/002; B62B 2205/06; B62B 3/10; B62B 3/007; B62B 5/061; F21V 23/02; F21Y 2115/10
    See application file for complete search history.

(56) References Cited

U.S. PATENT DOCUMENTS

| | | | | |
|---|---|---|---|---|
| 9,796,402 | B1 * | 10/2017 | Suarez | B62B 5/0053 |
| 9,950,729 | B2 * | 4/2018 | Choi | B62B 3/007 |
| 10,106,186 | B2 * | 10/2018 | Choi | C08K 5/00 |
| 11,498,601 | B2 * | 11/2022 | Zehfuss | B62B 7/008 |
| 11,592,815 | B2 * | 2/2023 | Armbrust | G05D 1/0274 |
| 12,263,876 | B1 * | 4/2025 | Zhu | B62B 3/025 |
| 2010/0090444 | A1 * | 4/2010 | Chen | B62B 3/106 |
| | | | | 280/651 |
| 2018/0057035 | A1 * | 3/2018 | Choi | B62B 9/26 |
| 2018/0170418 | A1 * | 6/2018 | Choi | C08L 63/00 |
| 2018/0215404 | A1 * | 8/2018 | Hayashi | B62B 5/004 |
| 2020/0401133 | A1 * | 12/2020 | Armbrust | G05D 1/0214 |
| 2021/0291886 | A1 * | 9/2021 | Zehfuss | B62B 3/007 |
| 2021/0380153 | A1 * | 12/2021 | Butler | B62B 5/0046 |
| 2022/0185353 | A1 * | 6/2022 | Wercholuk | B62B 3/022 |
| 2023/0174130 | A1 * | 6/2023 | Shibata | B62B 5/0033 |
| | | | | 180/19.1 |

FOREIGN PATENT DOCUMENTS

| | | | | | |
|---|---|---|---|---|---|
| CN | 108357525 | A | * | 8/2018 | .......... B62B 5/0069 |
| CN | 208278113 | U | * | 12/2018 | |
| CN | 208278114 | U | * | 12/2018 | |
| CN | 305003111 | S | | 1/2019 | |
| CN | 210707487 | U | * | 6/2020 | |
| CN | 212507804 | U | * | 2/2021 | |
| CN | 213848145 | U | | 8/2021 | |
| DE | 202020107541 | U1 | * | 2/2021 | ............... B62B 5/06 |
| KR | 101484092 | B1 | * | 1/2015 | ............. B62B 9/142 |
| KR | 101573235 | B1 | * | 12/2015 | ............... C08K 5/00 |
| KR | 20160093868 | A | * | 8/2016 | ............. B62B 3/027 |
| KR | 101697544 | B1 | * | 1/2017 | .......... B60B 33/0005 |
| KR | 200482803 | Y1 | * | 3/2017 | ............... B62B 3/02 |
| KR | 20190035442 | A | * | 4/2019 | .......... B62B 5/0036 |
| KR | 20200001115 | U | * | 5/2020 | .......... B62B 5/0069 |

* cited by examiner

ELECTRIC WAGON

CROSS-REFERENCE TO RELATED APPLICATIONS

This application claims priority pursuant to 35 U.S.C. 119 (a) to International Application No. PCT/CN2021/116635, filed on Sep. 6, 2021, which application claims priority to Chinese Application No. CN202022952516, filed on Dec. 11, 2020, which applications are incorporated herein by reference in their entireties.

TECHNICAL FIELD

The present utility model relates to the field of wagons, and more particularly, to an electric wagon (i.e. electric powered wagon).

BACKGROUND

For convenience of people's life, wagons may be used for cribs, picking up and dropping off children in kindergartens, shopping in supermarkets, as well as for outings, transporting goods, pet carts, and other aspects of life. However, the existing wagons may only be pushed by hand, have limited functions, and are inconvenient to use; and most of them cannot be folded, thus occupying a large space and being inconvenient to carry.

SUMMARY

The technical problem to be solved by the present utility model is to provide an electric wagon, which implements intelligent control, folding for storage, multiple functions and convenient operation, and meets various demands of users.

In order to solve the above-described technical problem, the technical solutions adopted by the present utility model are as follows:

The wagon of the present utility model comprises a frame fixed to a push rod, a front wheel and a rear wheel below the frame, a wagon body detachably connected with the frame, and a control unit fixed onto the frame; wherein the control unit comprises a controller, a control end wirelessly connected with the input end of the controller, and a motor electrically connected with the output end of the controller; and the motor is arranged within the rear wheel and connected with the rear wheel.

Further, the control end is fixed to a push handle through a snap groove; the control end is provided with a battery indicator light, a power button, and a speed control key, a direction key, and an electromagnetic region which are wirelessly connected with the input end of the controller; and the electromagnetic region is in adsorptive connection with an electromagnetic key.

Further, the push handle is movably connected with a top end of the push rod through a spin axis; the push rod is fixed to the frame through a top fixing seat and a bottom fixing seat; the top fixing seat is provided thereon with a telescopic rod that is movably connected with the top portion fixing seat; and at the bottom of the telescopic rod there is a telescopic tube that moves up and down along an inner wall of a vertical rod.

Further, the frame comprises a fixed unit symmetrically arranged, movable units symmetrically arranged on both sides of the fixed unit, and a foldable bottom plate movably connected with the fixed unit and the movable units; and the movable units on both sides are movably connected through a connecting rod below the foldable bottom plate.

Further, the fixed unit comprises vertical rods and horizontal rods between vertical rods; the vertical rod, the push rod, and the movable unit are all connected through a fixing seat; the fixing seat comprises a top fixing seat and a bottom fixing seat; and the foldable bottom plate is connected with the vertical rod and the movable unit through the bottom fixing seat.

Further, the movable unit comprises a first movable part and a second movable part in hinged connection; the first movable part comprises a first lifting rod and a first connecting rod in rotatable connection; the second movable part comprises a second lifting rod and a second connecting rod in rotatable connection; both the first lifting rod and the second lifting rod in hinged connection are movably connected with the top fixing seat; and both the first connecting rod and the second connecting rod in hinged connection are movably connected with the bottom fixing seat.

Further, the foldable bottom plate comprises a first horizontal rod and a second horizontal rod that are movably connected with each other through a rotating rod; and the connecting rod is arranged below the rotating rod; there are supporting members between the first horizontal rods and between the second horizontal rods; and the ends of the first horizontal rod and the second horizontal rod are connected with the vertical rods and the movable unit through the bottom fixing seat.

Further, the wagon body is provided with storage bags of varying sizes; a controller is provided below the storage bag; a battery electrically connected with the controller is arranged below the controller; and both the controller and the battery are fixed on the horizontal rod.

Further, the battery is electrically connected with a converter that is electromagnetically adsorbed on the upper part of the first lifting rod; the converter is provided with two or more USB interfaces; an LED light is arranged at the position corresponding to the USB interface; and a switch is arranged at the connection between the LED light and the power supply.

Further, the rotating shaft connected with the rear wheels is equipped with a brake.

Due to adoption of the above-described technical solutions, advantageous effects achieved by the present utility model are as follows:

The wagon of the present utility model has a reasonable structure and novel design, in which a control unit is provided on the basis of the existing wagon to implement intelligent control of moving forward, moving backward, accelerating, braking and other functions. To ensure safe use of users, there is further provided an electromagnetic adsorption keylock, which is easy to operate and multifunctional, so that various demands of users are met.

The frame adopts a foldable design, so that the whole wagon may be folded for storage, thereby reducing storage space, which is designed reasonably, convenient to use, and deeply loved by users.

Figure 1:
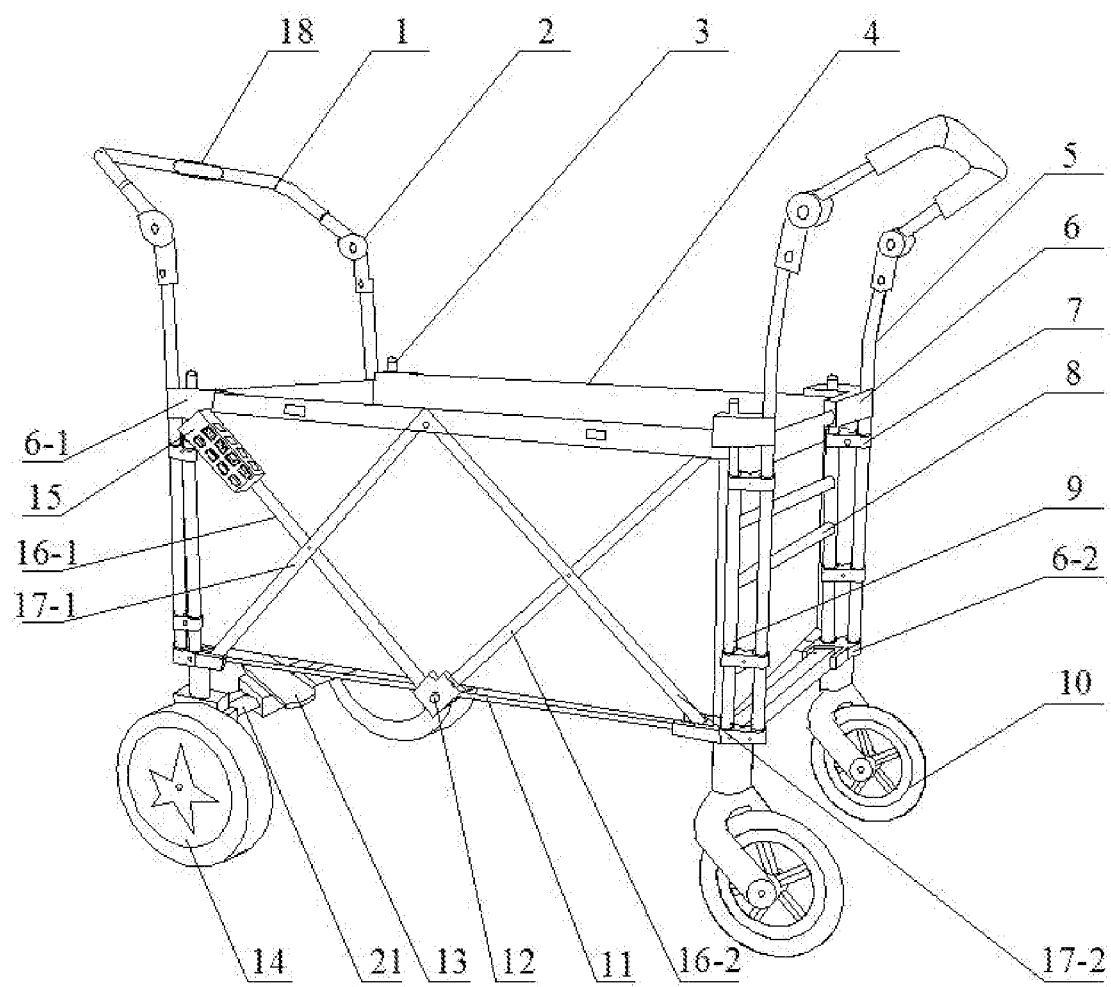
FIG. 1 is a schematic diagram of a stereoscopic structure of the wagon according to the present utility model.

Wherein, 1. push handle; 2. spin axis; 3. telescopic rod; 4. wagon body; 5. push rod; 6. fixing seat; 6-1. top fixing seat; 6-2. bottom fixing seat; 7. snap seat; 8. horizontal rod; 9. vertical rod; 10. front wheel; 11. foldable bottom plate; 12. connecting rod; 13. brake; 14. rear wheel; 15. converter; 16-1. first lifting rod; 16-2. second lifting rod; 17-1. first connecting rod; 17-2. second connecting rod; 18. control end; 19. storage bag; 20. battery; 21. rotating shaft.

DETAILED DESCRIPTION

Hereinafter, the present utility model will be further illustrated in detail with reference to the embodiments:

An electric wagon, as shown in FIG. 1 to FIG. 4, comprises: a frame fixed to a push rod 5, front wheels 10 and rear wheels 14 below the frame, a wagon body 4 detachably connected with the frame, and a control unit fixed to the frame; the wagon body 4 is made of canvas, plastic, or other material, and the frame serves to support the wagon body 4. A rotating shaft connecting the two rear wheels 14 is equipped with a brake 13 that may instantly and safely stop the wagon during traveling; the two front wheels 10 are universal wheels facilitating the wagon to travel in any direction; and the front wheels 10 and the rear wheels 14 may drive the frame and the wagon body 4 to travel on the ground.

A control unit is provided to meet requirements of users for intelligent control of the wagon. The control unit comprises a controller, a control end 18 wirelessly connected with an input end of the controller, and a brushless motor electrically connected with an output end of the controller; the controller may be a PLC control unit, a microcontroller, or other intelligent unit. The motor is arranged inside the rear wheel 14 and connected with the rear wheel 14 to drive the rear wheel 14 to move. The control end 18 is equipped with a speed control key 18-1, a direction key 18-3, and an electromagnetic region 18-4 that are wirelessly connected with the input end of the controller. The speed control key 18-1 may adjust the forward movement and braking of the wagon, with pushing forward for acceleration and pulling backward for electric braking. The direction key 18-3 is pressed once for moving backward, and pressed again for moving forward. Operations may be performed by adsorbing the electromagnetic key onto the electromagnetic region 18-4 to close the circuit, which is equivalent to a safety lock which is easily accessible, and may prevent the wagon from accelerating once it is released from hands, and also prevent children from mis-operation. By manually controlling the speed control key 18-1 or the direction key 18-3, a signal is wirelessly transmitted to the input end of the controller; after receiving the signal, the controller analyzes, compares, makes judgments, and then sends a command to the motor to drive the wagon to move forward or backward, accelerate, or brake, etc.

Figure 2:
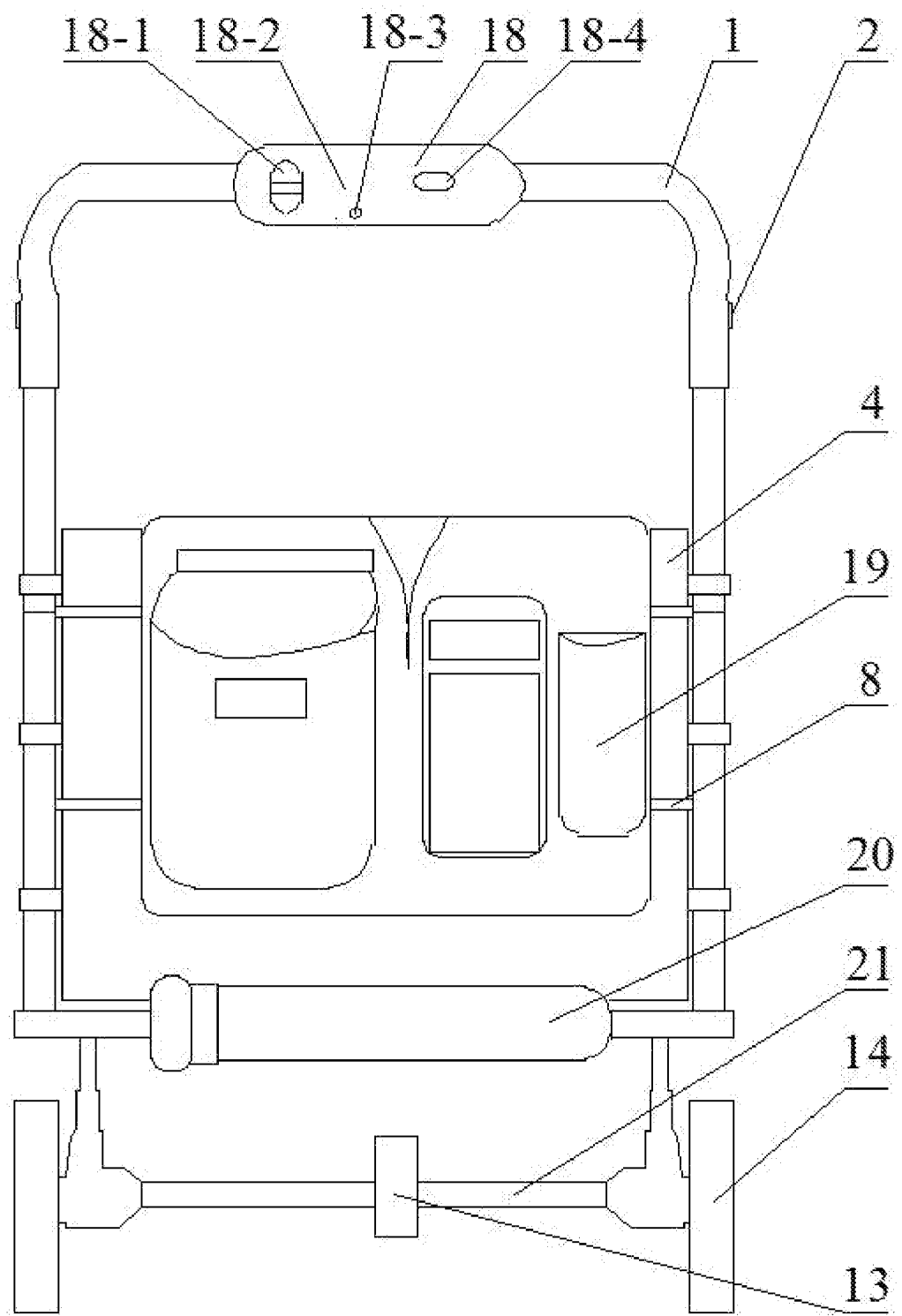
FIG. 2 is a structural schematic side diagram of the wagon according to the present utility model.

As shown in FIG. 1 and FIG. 2, the control end 18 is fixed to the push handle 1 through a snap groove, or the control end 18 may also be removed from the push handle 1, and held in hand to implement remote control of the wagon within a certain distance range. The control end 18 is provided thereon with a battery indicator light 18-2 and a power button. When the battery indicator light 18-2 shows low power, the control end 18 may be charged through a charging port until it is fully charged. The setting of the power button facilitates operations of turning on and off by the user.

The push handle 1 is movably connected with a top end of the push rod 5 through a spin axis 2, which facilitates rotating the push handle 1 to adjust an appropriate position of the wagon. As shown in FIG. 1, the frame comprises a fixed unit symmetrically arranged, movable units symmetrically arranged on both sides of the fixed unit, and a foldable bottom plate 11 movably connected with the fixed unit and the movable units; the movable units on both sides are movably connected through a connecting rod 12 below the foldable bottom plate 11; and the connecting rod 12 may also support the foldable bottom plate 11 and prevent it from moving downwards.

As shown in FIG. 1 and FIG. 2, the fixed unit comprises a vertical rod 9 and a horizontal rod 8 fixed between the vertical rods 9; both the controller and a lithium battery supplying power to the controller are fixed on the horizontal rod 8. The lithium battery is characterized by small size, convenience for carrying, and long service life. The push rod 5 is fixed to the vertical rod 9 through the fixing seat 6 to implement fixation of frame and the push rod 5. The fixing seat 6 comprises a top fixing seat 6-1 and a bottom fixing seat 6-2; in order to firmly fix the vertical rod 9 and the push rod 5, a snap seat 7 is arranged between the top fixing seat 6-1 and the bottom fixing seat 6-2.

Figure 3:
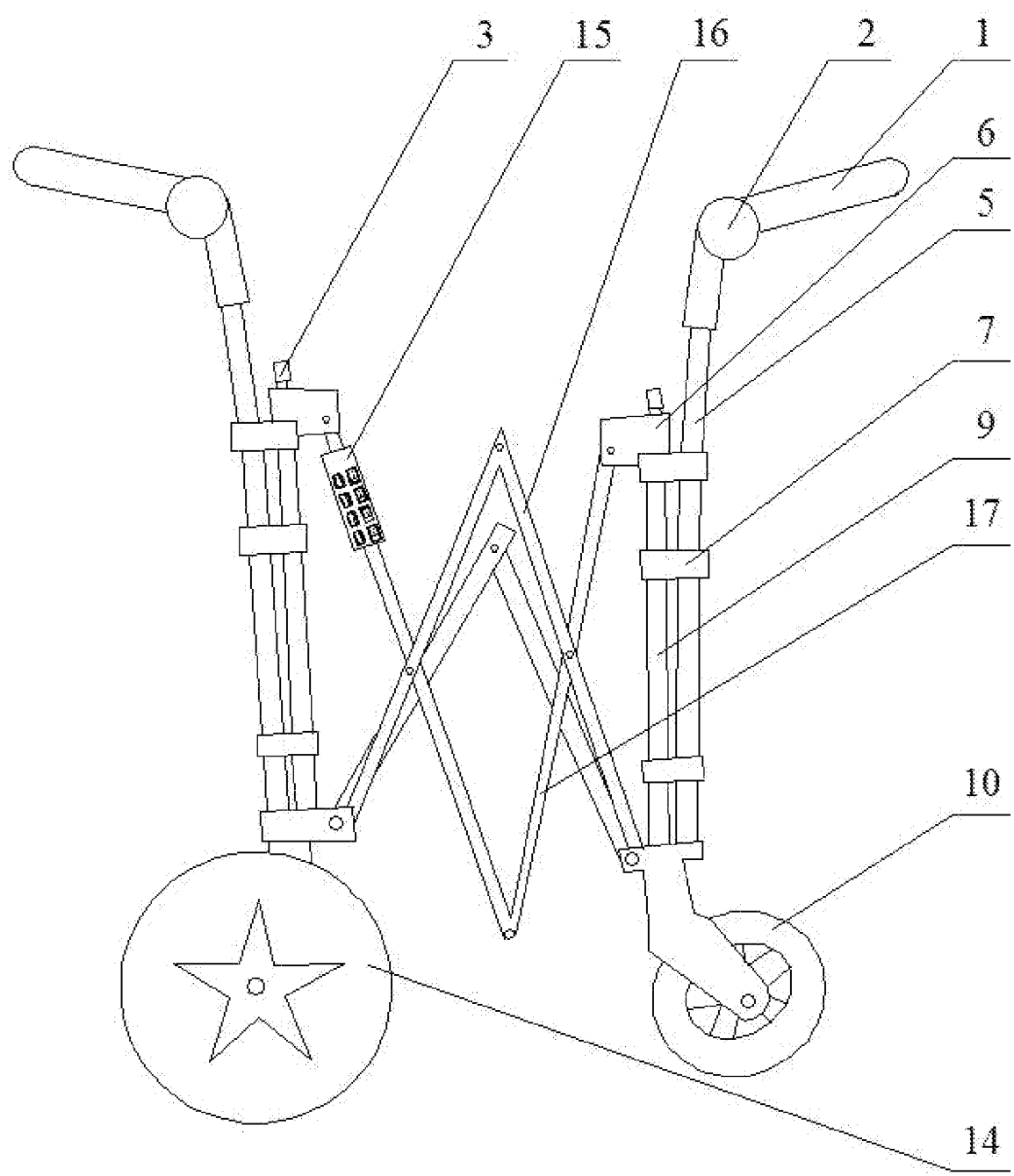
FIG. 3 is a structural schematic front diagram of the wagon in a folded state according to the present utility model.

As shown in FIG. 1 and FIG. 3, through the first movable part and the second movable part in hinged connection, the movable unit drives the frame on both sides and the wagon body 4 on the frame to gather inward so as to implement folding. The first movable part comprises a first lifting rod 16-1 and a first connecting rod 17-1 in rotatable connection; and the second movable part comprises a second lifting rod 16-2 and a second connecting rod 17-2 in rotatable connection.

One end of the first lifting rod 16-1 is movably connected with the top fixing seat 6-1 of the vertical rod 9; the other end of the first lifting rod 16-1 is in hinged connection with one end of the second lifting rod 16-2 through the connecting rod 12; the other end of the second lifting rod 16-2 is movably connected with the top fixing seat 6-1 of the vertical rod 9; one end of the first connecting rod 17-1 is movably connected with the bottom fixing seat 6-2 of the vertical rod 9; the other end of the first connecting rod 17-1 is in hinged connection with one end of the second connecting rod 17-2; and the other end of the second connecting rod 17-2 is movably connected with the bottom fixing seat 6-2 of the vertical rod 9.

Figure 4:
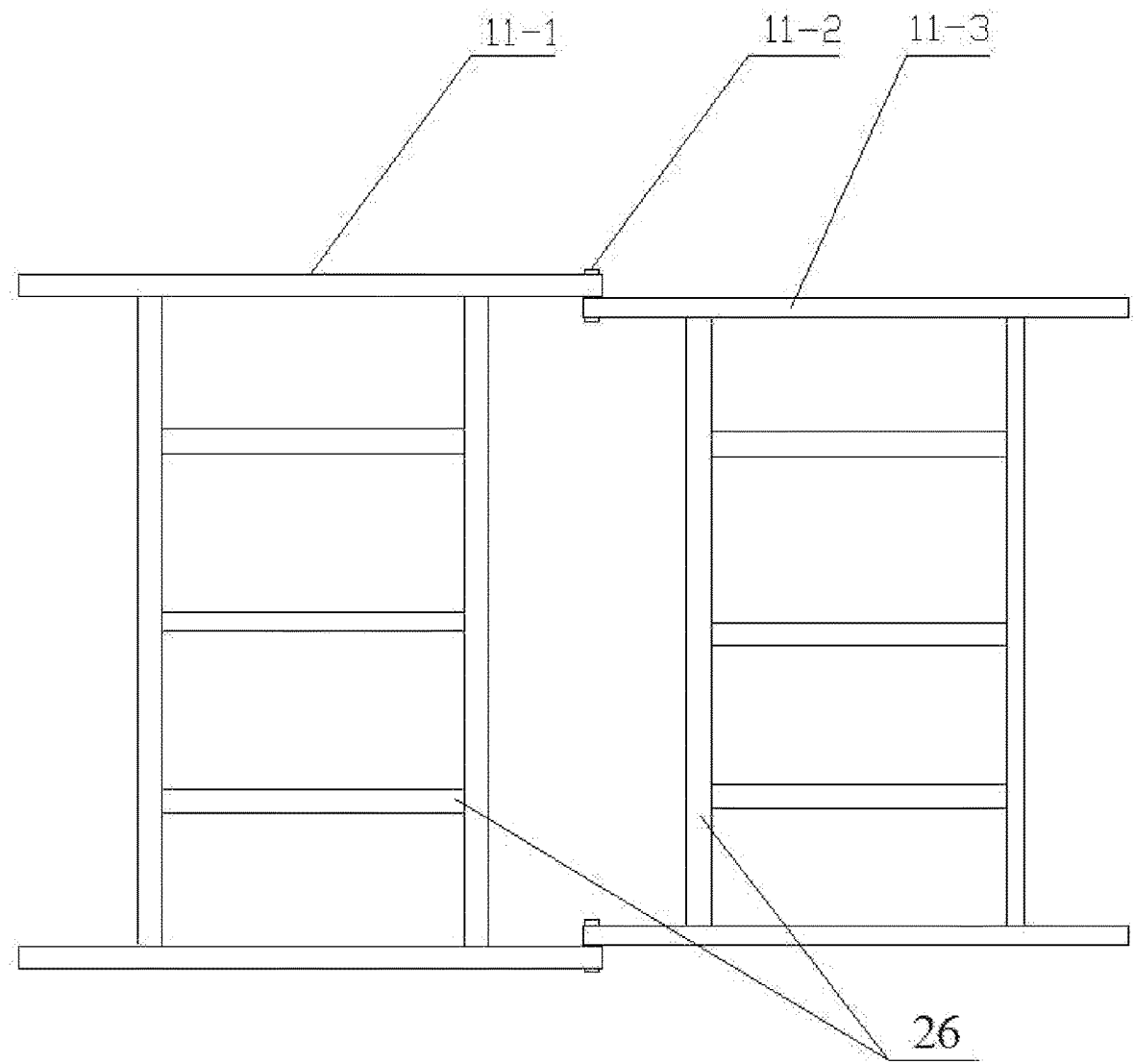
FIG. 4 is a structural schematic diagram of the bottom plate of the wagon according to the present utility model.

As shown in FIG. 4, the foldable bottom plate 11 comprises a first horizontal rod 11-1 and a second horizontal rod 11-3 that are in movable connection through a rotating rod 11-2; and the connecting rod 12 is arranged below the rotating rod 11-2 to support the foldable bottom plate 11. There are supporting members 26 between the first horizontal rod 11-1 and between the second horizontal rod 11-3; and the ends of the first horizontal rod 11-1 and the second horizontal rod 11-3 are connected with the vertical rod 9 and the movable units through the bottom fixing seat 6-2.

The vertical rod 9, the push rod 5, and the movable units are connected through the fixing seat 6; and the foldable bottom plate 11 is connected with the vertical rod 9 and the movable units through the bottom fixing seat 6-2. When the wagon needs to be folded for storage, the fixed unit on both sides are pulled inward, and the first movable part and the second movable part in hinged connection gather inward; the first horizontal rod 11-1 and the second horizontal rod 11-3 gather inward under an action of the rotating rod 11-2; and meanwhile, the frame and the wagon body 4 gather inward to be folded, as shown in FIG. 3. The foldable wagon is convenient to carry, occupies small space, and is favorable for storage and transportation. When the wagon is to be used, simply by pulling the fixed unit to both sides, the movable units and the foldable bottom plate 11 will be unfolded, as shown in FIG. 1.

The top fixing seat 6-1 is equipped with a telescopic rod 3 that is movably connected with the top fixing seat 6-1; and the telescopic rod 3 may be overlapped with a detachable hood. As shown in FIG. 1 and FIG. 3, the bottom of the telescopic rod 3 is equipped with a telescopic tube that moves up and down along an inner wall of the vertical rod 9. When the hood is needed, the telescopic rod 3 is pulled upwards so that the telescopic tube extends out of the vertical rod 9, and then fix the hood on a top end of the telescopic rod 3; when it is not needed, the hood is removed, and the telescopic rod 3 is pressed down to retract the telescopic tube back into the vertical rod 9.

As shown in FIG. 2, the wagon body 4 is provided with storage bags 19 of varying sizes which are convenient for storing, carrying items of varying sizes and shapes; the horizontal rod 8 below the storage bag 19 is provided with a controller; and a battery 20 electrically connected with the controller is arranged below the controller.

As shown in FIG. 1 and FIG. 3, the battery 20 is electrically connected with the converter 15 that is electromagnetically adsorbed on the upper part of the first lifting rod 16-1, and is easily accessible through electromagnetic adsorption. The converter 15 is provided with two or more USB interfaces; an LED light is arranged at the position corresponding to the USB interface; and a switch is arranged at the connection between the LED light and the power supply; and the LED light may be turned on and off by operating the switch. The USB interface facilitates connection with an electrical device having a USB interface, for example, such as a humidifier, an electric mattress, a radio light, and may also be used for charging. The number of USB interfaces may be two, three, or more according to customer requirements, thus making the wagon multifunctional and user-friendly, which meet various demands of users, and is deeply loved.

The invention claimed is:

1. An electric wagon, comprising:
a frame fixed to a push rod, front wheels and rear wheels below the frame, a wagon body detachably connected with the frame, and a control unit fixed onto the frame; wherein the control unit comprises a controller, a control end wirelessly connected with an input end of the controller, and a motor electrically connected with an output end of the controller; and,
the motor being arranged within the rear wheel and connected with the rear wheel; wherein the wagon body is provided with:
storage bags of varying sizes;
the controller is provided below the storage bag;
a battery electrically connected with the controller is arranged below the controller; and, both the controller and the battery are fixed on the horizontal rod; and, wherein the battery is electrically connected with a converter that is electromagnetically adsorbed on the upper part of a first lifting rod; and,
the converter is provided with two or more USB interfaces;
an LED light is arranged at the position corresponding to the USB interface; and,
a switch is arranged at the connection between the LED light and the power supply.

2. The electric wagon according to claim 1, wherein the control end is: fixed to a push handle;
the control end is provided with a battery indicator light, a power button, and a speed control key, a direction key, and an electromagnetic region wirelessly connected with the input end of the controller; and,
the electromagnetic region is in adsorptive connection with an electromagnetic key.

3. The electric wagon according to claim 2, wherein the push handle is:
movably connected with a top end of the push rod through a spin axis;
the push rod is fixed to the frame through a top fixing seat and a bottom fixing seat;
the top fixing seat is provided thereon with a telescopic rod that is movably connected with the top portion fixing seat; and,
at the bottom of the telescopic rod there is a telescopic tube that moves up and down along an inner wall of a vertical rod.

4. The electric wagon according to claim 3, wherein the frame comprises:
a fixed unit symmetrically arranged, movable units symmetrically arranged on both sides of the fixed unit, and a foldable bottom plate movably connected with the fixed unit and the movable units; and,
the movable units on both sides are movably connected through a connecting rod below the foldable bottom plate.

5. The electric wagon according to claim 4, wherein the fixed unit comprises:
a vertical rod and a horizontal rod between vertical rods;
the vertical rod, the push rod, and the movable unit are connected through a fixing seat;
the fixing seat comprises the top fixing seat and the bottom fixing seat; and,
the foldable bottom plate is connected with the vertical rod and the movable unit through the bottom fixing seat.

6. The electric wagon according to claim 5, wherein the movable unit comprises:
a first movable part and a second movable part in hinged connection;
the first movable part comprises the first lifting rod and a first connecting rod in rotatable connection;
the second movable part comprises a second lifting rod and a second connecting rod in rotatable connection;
both the first lifting rod and the second lifting rod in hinged connection are movably connected with the top fixing seat; and,
both the first connecting rod and the second connecting rod in hinged connection are movably connected with the bottom fixing seat.

7. The electric wagon according to claim 5, wherein the foldable bottom plate comprises;
a first horizontal rod and a second horizontal rod that are movably connected with each other through a rotating rod;
the connecting rod is arranged below the rotating rod;
there are supporting members between the first horizontal rods and between the second horizontal rods; and,
the ends of the first horizontal rod and the second horizontal rod are connected with the vertical rod and the movable unit through the bottom fixing seat.

8. The electric wagon according to claim 1, wherein a rotating shaft connected with the rear wheels is equipped with a brake.

\* \* \* \* \*